(No Model.)
E. W. COOKE.
HANGER FOR SHAFTING.
No. 442,355. Patented Dec. 9, 1890.
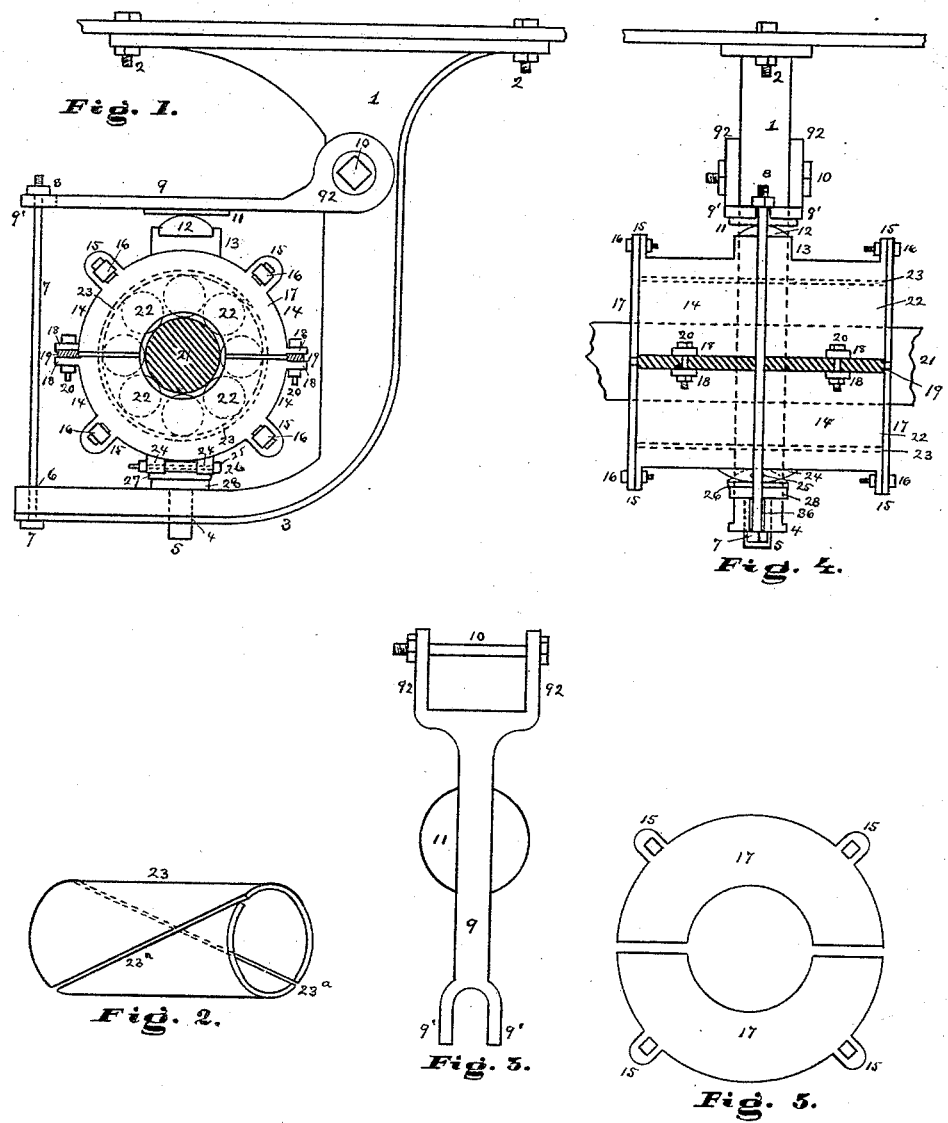

UNITED STATES PATENT OFFICE.

ERNEST WM. COOKE, OF CHICAGO, ILLINOIS, ASSIGNOR TO THE AMERICAN ROLLER BEARING COMPANY, OF SAME PLACE.

HANGER FOR SHAFTING.

SPECIFICATION forming part of Letters Patent No. 442,355, dated December 9, 1890.

Application filed January 22, 1890. Serial No. 337,773. (No model.)

*To all whom it may concern:*

Be it known that I, ERNEST WILLIAM COOKE, a citizen of the United States, residing at Chicago, in the county of Cook and State of Illinois, have invented a new and useful Hanger for Line-Shafting, of which the following is a specification.

My invention relates to hangers for line-shafting in which a shaft is supported in a box containing a series of rollers, and which said box is held by an arm hinged to the bracket of the hanger, and said box having lugs at the bottom securing it by a pin to a pivot-plate, on the bottom of which is a pin passing through a hole in the fixed horizontal arm of the hanger.

My object is to provide a hanger for line-shafting in which the box may be removed while the shaft is in place. On the top of the box and between the pivot-plate and the fixed horizontal arm of the hanger I place rubber washers to prevent the vibration spreading to the hanger-bracket. The fixed horizontal arm and the swinging horizontal arm are secured together by a vertical bolt. I attain this object by means of the mechanism shown in the accompanying drawings, in which—

Figure 1 is a side view of the hanger with the parts *in situ*. Fig. 2 is a view of the cylindrical bushing incasing the rollers. Fig. 3 is a top view of the swinging horizontal arm. Fig. 4 is a front view of the hanger with parts *in situ*. Fig. 5 is a view of the end caps of the box.

Similar figures refer to similar parts throughout the several views.

I secure the hanger-bracket 1 to a beam or floor by the bolts 2. At the lower end of the vertical arm is a horizontal arm 3, which has at a convenient point a hole 4, drilled to receive the pin 5 of the pivot-plate 26. I place a bolt 7 in a fork 6 in the end of the arm 3, said bolt 7 resting in the fork 9' of the swinging arm 9, the said swinging arm 9 being secured in position by the nut 8. In the hole 4 I place the pin 5, which is part of the pivot-plate 26. Between the pivot-plate 26 and the horizontal arm 3 I place a rubber washer 27, resting on the disk 28, which is part of the horizontal arm 3. The upper surface of the pivot-plate 26 has a lug which fits between the lugs 24 of the box 14, said lugs 24 being held to the pivot-plate 26 by a pin 25. The box 14 is divided horizontally into two halves of cylindrical shape. The two halves are held together by the lugs 18 and bolts 20, and between the two halves I place a strip of wood 19 19. At each end of the box 14 I place caps 17, secured to the box by bolts 16, passing through holes in the lugs 15, to keep the rollers in position. Within the box 14 I place a metallic bushing 23, which is divided into two halves by a spiral cut $23^a$, which enables the halves to be removed at pleasure, and when in place will expand or contract with the tightening or loosening of the box 14 by means of the bolts 20. Within the box 14 and bushing 23 I place a series of rollers 22, which roll within the bushing 23, supporting the shaft 21, passing through the center of the box 14. On the top of the roller-box 14 is a socket 13, into which I place the rubber cushion 12, upon which rests the plate 11 of the swinging arm 9. At a convenient point on the vertical portion of the hanger I drill a hole and adjust to it a bolt 10. I secure on said bolt 10 a swinging arm 9, with lugs $9^2$, that fit over the bracket. The swinging arm 9 is provided with a shank, and at a convenient point is the plate 11, which rests upon the cushion 12. At the outer end of the swinging arm 9 is a fork 9', which embraces the end of the bolt 7.

Having thus described the parts of my invention, I now proceed to explain the method of operating the same.

I put the parts together so that the pin of the plate rests in the hole 4 of the fixed horizontal arm of the hanger, and the washer 27 is between the pivot-plate 26 and the disk 28 of the horizontal arm 3. The box 14 is secured to the lug of the pivot-plate 26 by the pin 25, which passes through the lug 24 of the box 14. The lower half of the bushing 23 is then placed in the box. The rollers 22 are then placed about the shaft 21. Then the upper half of the bushing 23 and upper half of the box 14 are secured to the lower half of the box 14 by the bolts 20, having between the upper and lower portions of the box strips of wood 19. The end plates 17 are then bolted to each end of the box 14 by the bolts 16. The bolts 20 are then tightened till the bushing 23 takes up all the space between the shaft and the rollers. I then bring down the swinging arm 9 onto the rubber cushion 12 and secure it in position by tightening the nut 8 of the bolt 7.

While I have shown and described a journal-box in connection with my improved hanger, it is of course evident that I may mount in it any kind of journal-box adapted to be secured therein. I am, however, fully aware that hangers for line-shafting are in use and are not new, and I do not lay claim to hangers for line-shafting in a broad sense; but What I do claim, and desire to secure by Letters Patent of the United States, is—

1. In a hanger for line-shafting, the combination of a single vertical and a horizontal arm with another horizontal arm pivoted to the vertical arm of the hanger, and a bolt for securing the two horizontal arms together, all substantially as and for the purpose set forth and described.

2. In a hanger for line-shafting, the combination of a vertical and a horizontal arm, the latter provided with a hole, a pivot-plate seated in said hole, the pivoted horizontal arm, and means for securing a box between said pivoted horizontal arm and plate, all substantially as and for the purpose set forth and described.

3. In a hanger for line-shafting, a bracket provided with horizontal arms, one of which is pivoted, means for securing a box between said arms, and a cushion between the box and one of said arms for diminishing vibration, all substantially as and for the purpose set forth and described.

4. In a hanger for line-shafting, a bracket provided with horizontal arms, one integral and the other pivoted, a pivot-plate seated in one of said arms, means for securing a journal-box in said hanger, and cushions interposed between said box and arms, all substantially as and for the purpose set forth and described.

5. The combination of a hanger provided with vertical and horizontal arms, a pivot-plate seated in one of the said horizontal arms, and a journal-box provided with lugs adapted to fit on said pivot-plate and to be secured in said hanger, all substantially as and for the purpose set forth and described.

ERNEST WM. COOKE.

In presence of—
T. McALLISTER,
T. E. SHEEHE.